United States Patent [19]
Yoshida

[11] Patent Number: 5,287,728
[45] Date of Patent: Feb. 22, 1994

[54] POWER TRANSMISSION DEVICE FOR PRESS MACHINE

[75] Inventor: Akihiro Yoshida, Gifu, Japan

[73] Assignee: Kabushiki Kaisha Yamada Dobby, Risai, Japan

[21] Appl. No.: 988,325

[22] Filed: Dec. 9, 1992

[30] Foreign Application Priority Data

Oct. 5, 1992 [JP] Japan .................. 4-288208

[51] Int. Cl.⁵ .......................................... F16H 21/16
[52] U.S. Cl. .......................................... 74/40; 74/38; 74/51; 74/834
[58] Field of Search .................. 74/38, 39, 40, 41, 42, 74/43, 45, 48, 51, 834

[56] References Cited

U.S. PATENT DOCUMENTS

| | | | |
|---|---|---|---|
| 731 | 5/1838 | Waterman | 74/38 |
| 68,754 | 9/1867 | Knight | 74/38 |
| 136,334 | 2/1873 | Myers | 74/38 |
| 250,523 | 12/1881 | Golay | 74/39 |
| 1,401,317 | 12/1921 | Comstock | 74/38 |
| 3,174,347 | 3/1965 | Hecht | 74/40 |

FOREIGN PATENT DOCUMENTS

2-165900 6/1990 Japan .
1618947 1/1991 U.S.S.R. .................. 74/38

*Primary Examiner*—Leslie A. Braun
*Assistant Examiner*—William O. Trousdell
*Attorney, Agent, or Firm*—Stoel Rives Boley Jones & Grey

[57] ABSTRACT

A power transmission device for a press machine comprises a connection link connected to a crankshaft of the press machine and reciprocated in accordance with the rotation of the crankshaft, a first slider provided in a frame of the press machine so as to be reciprocated in a first direction, and pivotally connected to the connection link, a first link mechanism provided with a pair of first links pivotally connected to each other, wherein one of the first links is pivotally connected to either the connection link or the first slider so as to be folded and extended while following up the reciprocating movement of the connection link, a second slider provided in the frame displaceably in the first direction and pivotally connected to the other first link, and a mechanism for adjusting the position of the second slider in the first direction, whereby the bottom dead center position and the stroke length of a slide can be adjusted by a common mechanism.

6 Claims, 7 Drawing Sheets

POWER TRANSMISSION DEVICE FOR PRESS MACHINE

BACKGROUND OF THE INVENTION

1. Field of the Invention

This invention relates to a power transmission device for a press machine for converting the rotary motion of a crankshaft supported by a frame into a reciprocating motion and transmitting the reciprocating motion to a slide.

2. Description of the Prior Art

In a press machine for converting the rotary motion of a crankshaft into a reciprocating motion and transmitting the reciprocating motion to a slide such as a knuckle press, it is important to keep a bottom dead center position of the slide constant during a working operation. For this reason, in this kind of press machine, it is proposed as a subject to detect the amount of variation of the bottom dead center position and to adjust the bottom dead center position in accordance with the detected amount of variation.

For solving the subject described above, there has been proposed a bottom dead center correcting device for the press machine, in which a movable side supporting point of a knuckle is connected to a slide and a fixed side supporting point thereof is varied by following up the variation of a bottom dead center position (Japanese Patent Public Disclosure (KOKAI) No. 2-165900). In the bottom dead center correcting device, a fixed side supporting point shaft is moved in the vertical direction by supporting a worm wheel eccentrically on the fixed side supporting point shaft of the knuckle and rotating the worm wheel by means of a worm screw meshing with the worm wheel.

In any known bottom dead center adjusting devices, however, the movable side supporting point is connected to a slide. Therefore, when the worm wheel is rotated, the bending and extending range of the knuckle is moved parallel in the vertical direction. Accordingly, the bottom dead center position of the slide can be adjusted, but the stroke length of the slide cannot be adjusted.

SUMMARY OF THE INVENTION

An object of the present invention is to enable a common mechanism to adjust the bottom dead center position and the stroke length of a slide.

A power transmission device of the present invention comprises a connection link connected to a crankshaft of a press machine and reciprocated in accordance with the rotation of the crankshaft, a first slider provided in the frame of the press machine so as to be reciprocated in a first direction, and pivotally connected to the connection link, a first link mechanism provided with a pair of first links connected pivotally to each other, wherein one of the first links is pivotally connected to the connection link or the first slider so as to be folded and extended while following up the reciprocating movement of the connection link, a second slider provided in the frame displaceably in the first direction and pivotally connected to the other first link, and a mechanism for adjusting the position of the second slider in the first direction with respect to the frame.

A connection point between one of the first links and either the connection link or the first slider acts as a movable side supporting point of the first link mechanism, and a connection point between the other first link and the second slider acts as a fixed side supporting point of the first link mechanism. The first slider regulates, or restricts, the moving direction of the movable side supporting point so as to be in the first direction in cooperation with the frame. Therefore, when the crankshaft is rotated, the first link mechanism is folded and extended in accordance with the reciprocating movement of the connection link. The slide is reciprocated by receiving the folding and extending motion of the first link mechanism.

The second slider regulates, or restricts, the displaceable direction of the fixed side supporting point of the first link mechanism so as to be in the first direction. When the second slider is displaced by the position adjusting mechanism in the first direction with respect to the frame, the position of the fixed side supporting point of the first link mechanism with respect to the frame is varied. At this time, since the position of the movable side supporting point is not varied, the angle of folding of the first link mechanism is varied without any parallel movement of the folding and extending range of the first link mechanism in the first direction. As a result, when the position of the second slider in the first direction is varied, the bottom dead center position and the stroke length of the slide are varied.

Accordance to the present invention, the power transmission device comprises a connection link for connecting the movable side supporting point of a first link mechanism to an eccentric portion of a crankshaft, a first slider for regulating the reciprocating movement direction of the movable side supporting point of the first link mechanism so as to be in a first direction, a second slider for regulating the displaceable direction of the fixed side supporting point of the first link mechanism so as to be in the first direction, and a mechanism for adjusting the position of the second slider in the first direction. Therefore, when the position of the second slider in the first direction is adjusted, the angle of folding of the first link mechanism is varied without any parallel movement of the folding and extending range of the first link mechanism in the first direction, and as a result, both of the bottom dead center position and the stroke length of the slide can be adjusted by the common position adjusting mechanism.

The position adjusting mechanism is preferably provided with a male screw connected to the second slider and extending in the first direction, a worm wheel engaged with the male screw and mounted on the frame rotatably around an axis extending in the first direction and immovably in the first direction, and a worm screw geared with the worm wheel. Therefore, since the worm wheel cannot be displaced in the first direction, the second slider is displaced in the first direction and the bottom dead center position and the stroke length of the slide are varied, when the worm wheel is rotated. For this reason, both of the bottom dead center position and the stroke length can be adjusted finely.

Furthermore, the power transmission device preferably includes a second link mechanism provided with a pair of second links pivotally connected to each other, wherein one of the second links is pivotally connected to the frame and the other second link is pivotally connected to a first rod extending from the slide in a second direction parallel to the first direction, respectively, so as to be folded and extended while following up the folded and extending motion of the first link mechanism. In this case, the connection point between one of the second links and the frame acts as a fixed side supporting point of the second link mechanism, and the connection point between the other second link and the first rod acts as a fixed side supporting point of the second link mechanism. Therefore, the second link mechanism acts as a knuckle mechanism or a toggle mechanism, and the press machine acts as a knuckle press machine or a toggle press machine.

Furthermore, the power transmission device preferably includes a third link mechanism provided with a pair of third links pivotally connected to each other, wherein one of the third links is pivotally connected to the connection link or the first slider and the other third link is pivotally connected to the second slider, respectively, so as to be folded and extended in synchronism with the first link mechanism while following up the reciprocating movement of the connection link, and a fourth link mechanism provided with a pair of fourth links pivotally connected to each other such that one of the fourth links is pivotally connected to the frame and the other fourth link is pivotally connected to a second rod extending from the slide in a third direction parallel to the first and second directions, respectively, so as to be folded and extended while following up the folding and extending motion of the third link mechanism. In this case, the third and fourth link mechanisms act similarly to the first and second link mechanisms, respectively. For this reason, the slide is reciprocated by the first and second link mechanisms and the third and fourth link mechanisms, and therefore, the reciprocating movement of the slide is stabilized.

A guide portion for regulating the movements of the first and second sliders to a reciprocating movement in the first direction can be formed in the frame. The first direction may be a different direction from that of the reciprocating movement of the slide, e.g., horizontal direction, but it may also be the same direction as that of the reciprocating movement of the slide, e.g., the vertical direction.

BRIEF DESCRIPTION OF THE DRAWINGS

The foregoing and other objects and advantages of the invention will be apparent from the following description of a preferred embodiment of the invention with reference to the accompanying drawings, in which.

DETAILED DESCRIPTION OF THE PREFERRED EMBODIMENT

Figure 1:
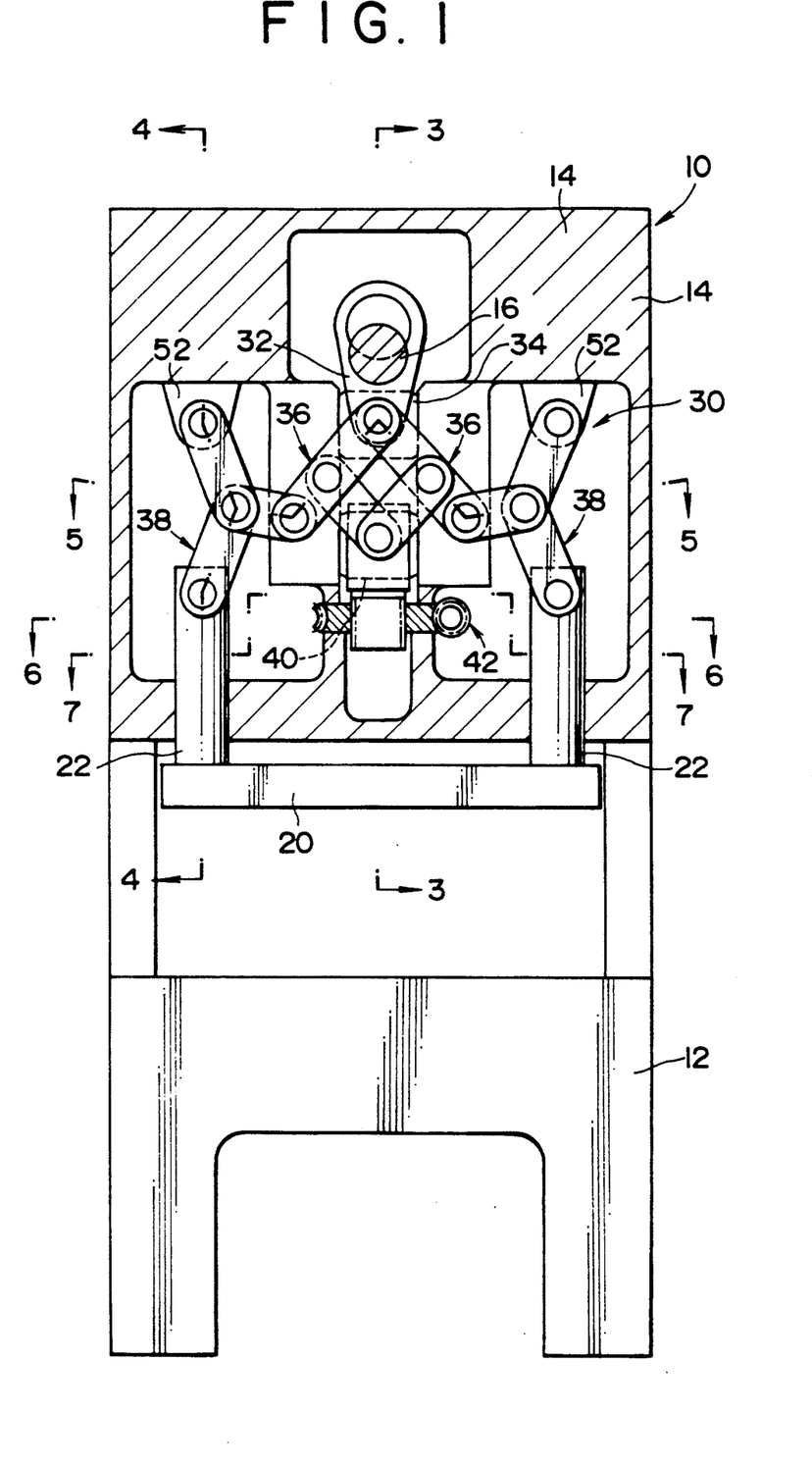
FIG. 1 is a sectional front view partially showing a press machine provided with a power transmission device of the present invention.

Referring now to FIG. 1, a press machine 10 includes a lower frame 12 for placing a bottom part and an upper frame 14 supported by the lower frame. A crankshaft 16 is supported by the upper frame 14 rotatably around an axis extending in the horizontal direction and receives the rotation of a fly-wheel 18 shown in FIG. 3. A so-called "slide" 20 for supporting a top part is mounted on the lower end of a pair of rods 22 passing through a lower end portion of the upper frame 14 movably in the vertical direction.

Both rods 22 extend upwards parallel with each other from both ends of the slide 20 and are reciprocated in the vertical direction by a power transmission device 30 for converting the rotary motion of the crankshaft 16 into a reciprocating motion in the vertical direction. In this manner, the slide 20 is reciprocated in the vertical direction.

The power transmission device 30 comprises a connection link 32 connected to the crankshaft 16, a pair of first sliders 34 provided in the upper frame 14 so as to be reciprocated in the vertical direction and pivotally connected to the connection link 32, a pair of link mechanisms 36 to be folded and extended in synchronism with each other while following up the reciprocating movement of the first sliders, a pair of link mechanisms 38 individually corresponding to the link mechanisms 36 and folded and extended while following up the folding and extending motions of the corresponding link mechanisms 36, a pair of second sliders 40 provided in the upper frame 14 displaceably in the vertical direction and pivotally connected to both link mechanisms 36, and a position adjusting mechanism 42 for adjusting the positions of the second sliders 40 in the vertical direction, respectively.

As shown in FIGS. 2 through 7, the connection link 32 is connected to an eccentric portion of the crankshaft 16 and reciprocally moved in the vertical direction in accordance with the rotation of the crankshaft 16. The first and second sliders 34 and 40 are received movably in the vertical direction by a guide portion 44 formed in the upper frame 14. The first sliders 34 are reciprocally moved in a vertical direction while following up the reciprocating movement of the connection link 32. The second sliders 40 are reciprocally moved in the vertical direction while following up the folding and extending motion of both link mechanisms 36.

Figure 2:
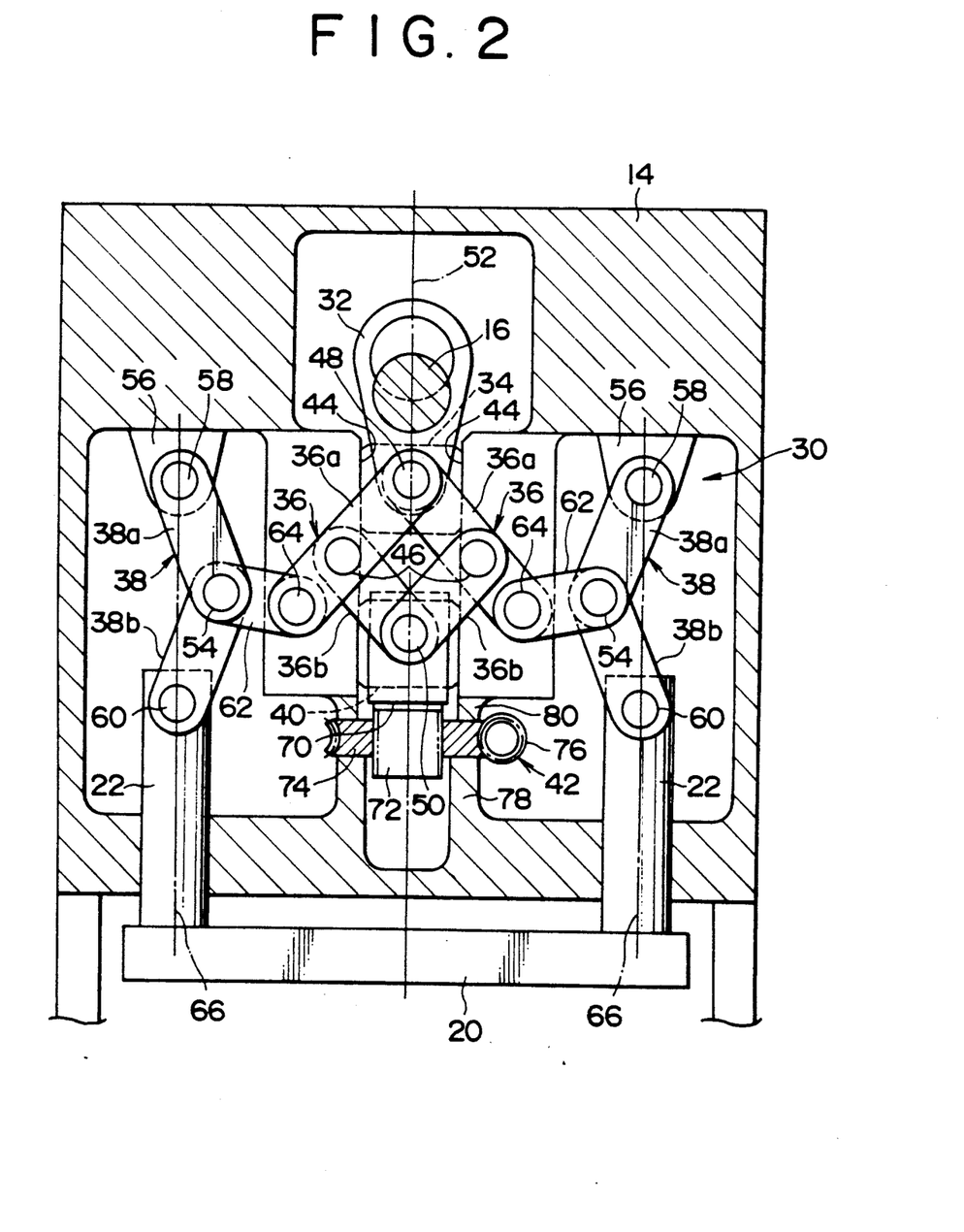
FIG. 2 is an enlarged sectional front view of the present invention.
Figure 3:
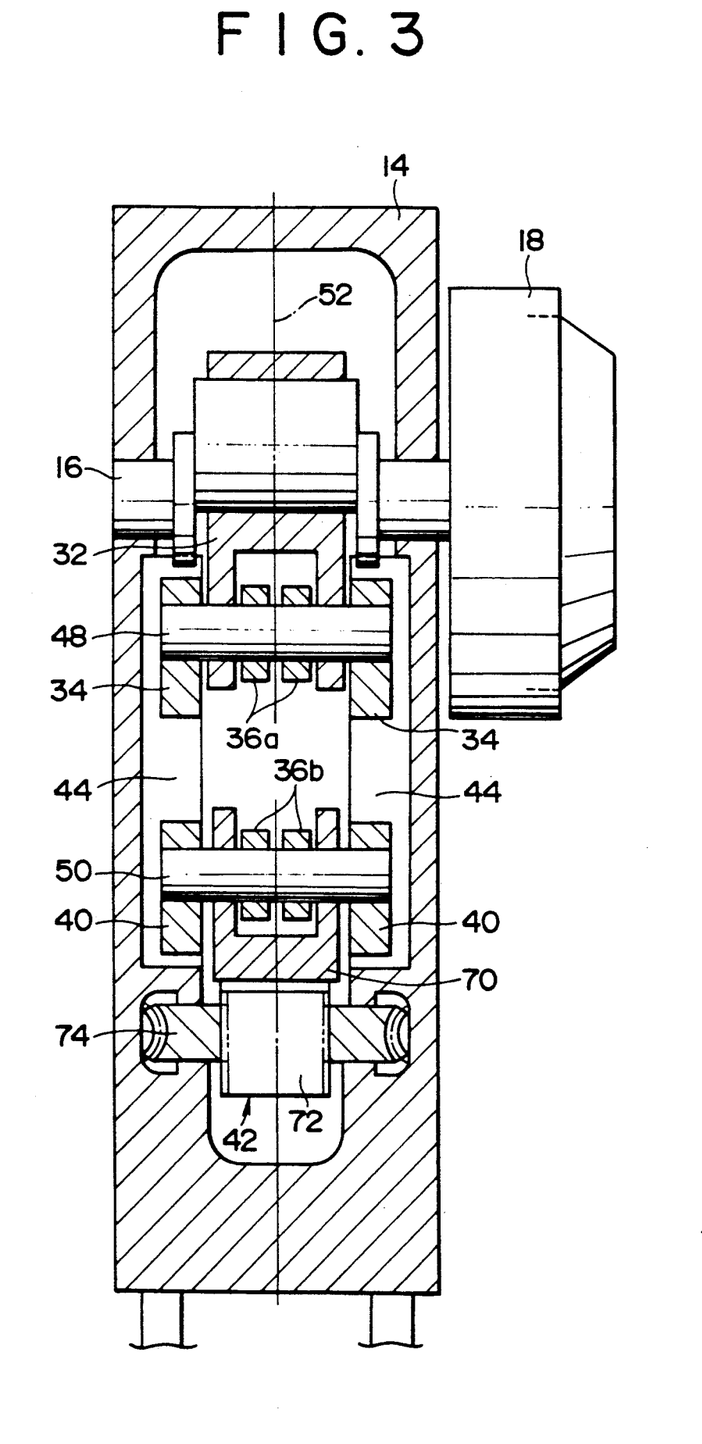
FIG. 3 is an enlarged sectional view taken along line 3—3 of FIG. 1.
Figure 5:
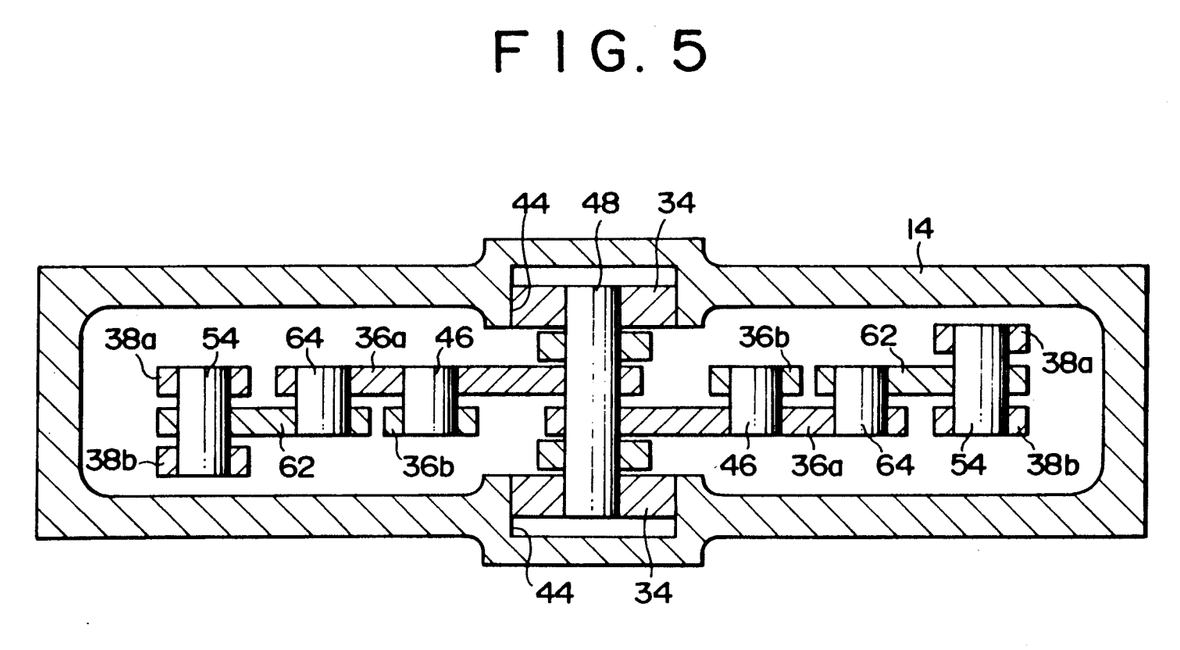
FIG. 5 is an enlarged sectional view taken along line 5—5 of FIG. 1.

As shown in FIGS. 2, 3 and 5, each link mechanism 36 is provided with a pair of links 36a and 36b pivotally connected to each other by a pivot 46 (refer to FIG. 5). One link 36a of each of the link mechanisms 36 is rotatably connected to the connection link 32 and the first slider 34 by a common pivot 48 rotatably around an axis extending in the horizontal direction, and the other link 36b is connected to the second slider 40 by a common pivot 50 rotatably around an axis extending in the horizontal direction.

In an illustrated embodiment, the pivots 48 and 50 are arranged so as to conform to an axis 52 (refer to FIG. 2) extending in the vertical direction through the rotary center of the crankshaft 16. However, it is not necessary to arrange the pivots 48 and 50 in such a manner.

In an illustrated embodiment, the link 36a of each link mechanism 36 is connected directly to both of the connection link 32 and the first slider 34, but the link 36a of each link mechanism 36 may be connected to only one of the connection link 32 and the first slider 34.

Figure 4:
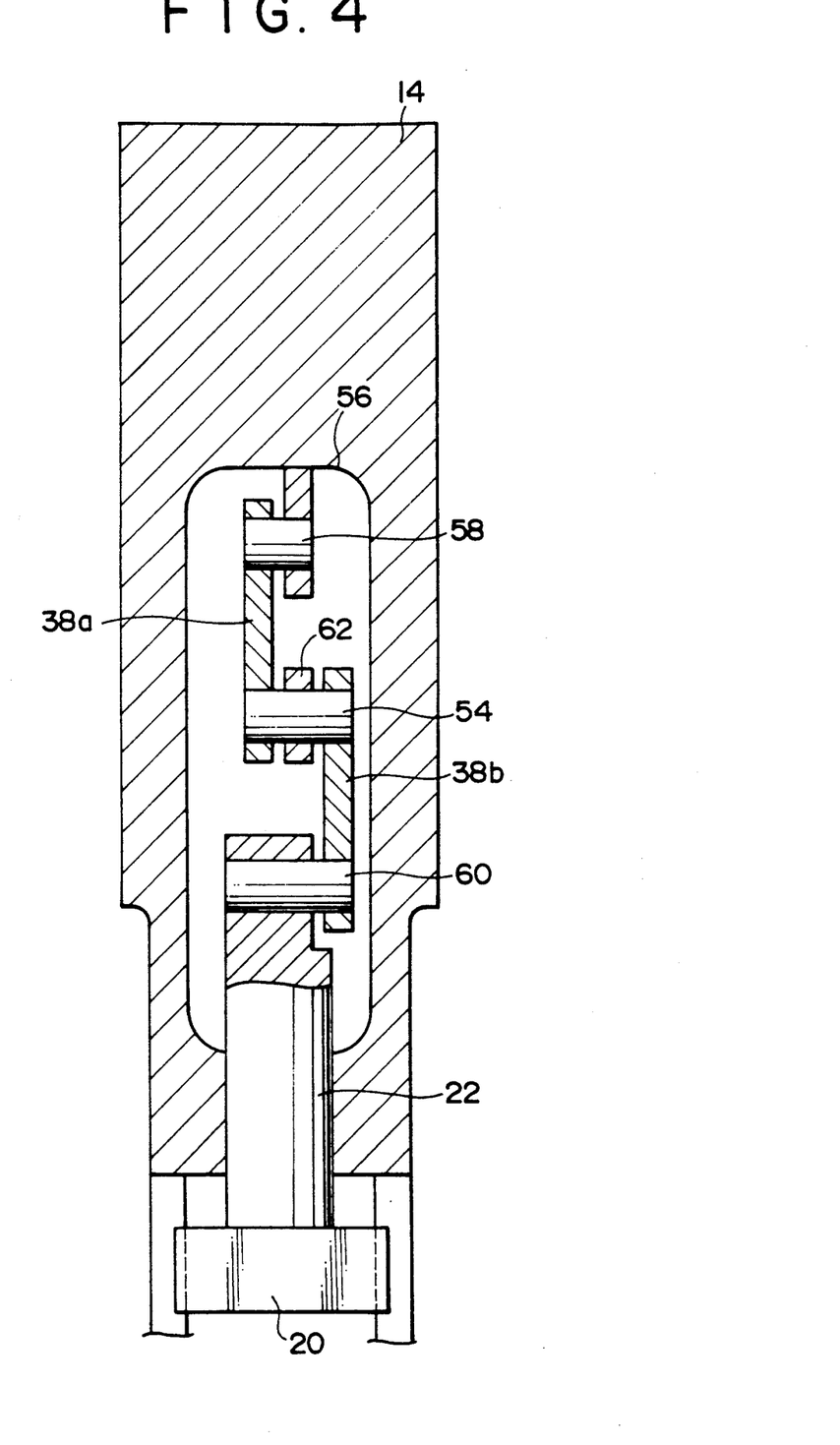
FIG. 4 is an enlarged sectional view taken along line 4—4 of FIG. 1.

As shown in FIGS. 2, 4 and 5, each link mechanism 38 is also provided with a pair of links 38a and 38b pivotally connected to each other by a pivot 54 (refer to FIGS. 4 and 5). One link 38a of each link mechanism 38 is connected to a bracket 56 mounted on the upper frame 14 by a pivot 58 rotatably around an axis extending in the horizontal direction, and the other link 38b is connected to the rod 22 by a pivot 60 rotatably around an axis extending in the horizontal direction.

Each link mechanism 38 is pivotally connected to the corresponding link mechanism 36 by the pivot 54, a link 62 and a pivot 64 so as to be folded and extended while following up the folding and extending motion of the corresponding link mechanism 36. In an illustrated embodiment, the pivots 58 and 60 are arranged so that the pivotal points thereof may conform to an axis 66 (refer to FIG. 2) extending in the vertical direction through the axis of the rod 22. However, it is not necessary to provide the pivots 58 and 60 in such a manner.

In an illustrated embodiment, each link mechanism 38 is connected to the link 36a, but the link 62 may be connected to either the link 36b or both links 36a and 36b. Without using the link 62, each link mechanism 38 may be connected directly to the link mechanism 36, and one of the links 38a and 38b may be connected to the link mechanism 36.

As shown in FIGS. 2, 3, 6 and 7, the position adjusting mechanism 42 is provided with a bifurcated bracket 70 pivotally connected to both links 36b and both second sliders 40 by the pivot 50, a male screw 72 extending downwards from the bracket, a worm wheel 74 engaged with the male screw, and a worm screw 76 geared with the worm wheel. Instead of using the bracket 70, the male screw 72 may be pivotally connected to both links 36b and both second sliders 40 by the pivot 50.

Figure 6:
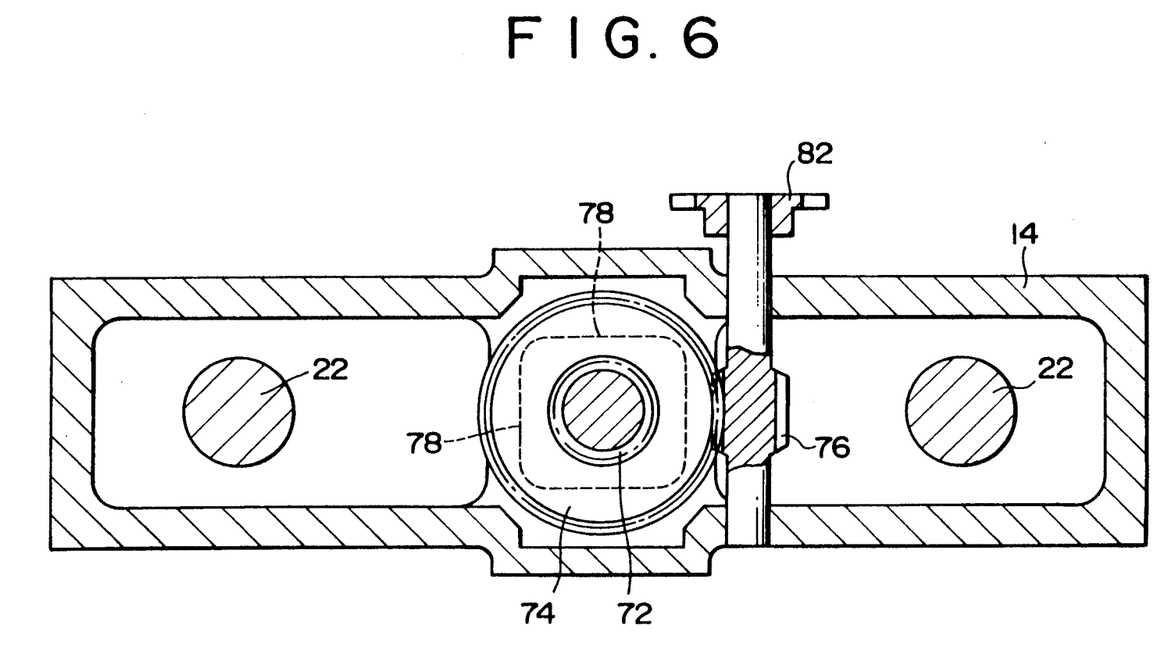
FIG. 6 is an enlarged sectional view taken along line 6—6 of FIG. 1.
Figure 7:
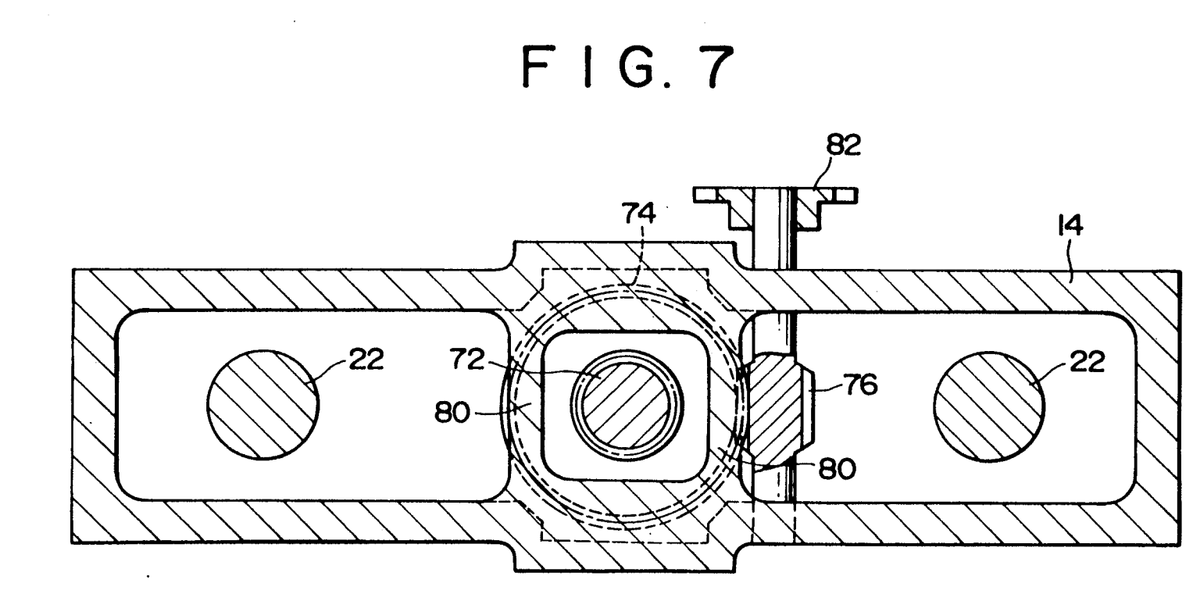
FIG. 7 is an enlarged sectional view taken along line 7—7 of FIG. 1.

The male screw 72 is connected to the bracket 70 irrotatably around the axis 52. The worm wheel 74 is supported by supporting portions 78 and 80 of the upper frame 14 rotatably around the axis and immovably in the vertical direction. A shaft portion of the worm screw 76 rotatably passes through the upper frame 14 and is provided with a sprocket 82 at an end thereof. The sprocket 82 is rotated by a rotational mechanism (not shown) such as a motor.

When the sprocket 82 is rotated, the worm screw 76 is rotated, the worm wheel 74 geared with the worm screw 76 is rotated, and the male screw 72 engaged with the worm wheel 74 is moved upwards or downwards. Finally, the second slider 40 is moved upwards or downwards.

Since the connection link 32 is reciprocally moved in the vertical direction in accordance with the rotation of the crankshaft 16 in the press machine 10, the first slider is reciprocally moved in the same direction. In addition, the second slider 40 is not moved so long as the worm wheel 74 is not rotated. For this reason, the pivot 48 acts as a movable side supporting point of the link mechanism 36, and the pivot 50 acts as a fixed side supporting point of the link mechanism 36.

The link 38a is connected to the bracket 56 fixed to the upper frame 56. On the other hand, the link 38b is connected to the rod 22 which is movable in the vertical direction. Therefore, the pivot 58 acts as a fixed side supporting point of the link mechanism 38, whereas the pivot 60 acts as a movable side supporting point of the link mechanism 38.

When the rotation of the fly-wheel 18 is transmitted to the crankshaft 16, the connection link 32 and the first slider 34 are reciprocally moved in accordance with the rotation of the crankshaft 16. Therefore, both link mechanisms 36 are folded and extended synchronously. Both link mechanisms 38 are folded thereby synchronously, and as a result, the slide is reciprocally moved.

For this reason, the link mechanism 38 acts as a knuckle or toggle mechanism.

When the second slider 40 is moved upwards, the angle of folding of the link mechanism 36 becomes smaller, and the angle of folding of the link mechanism 38 becomes larger thereby, resulting in the downward movement of the slide 20. On the other hand, when the second slider 40 is moved downwards, the angle of folding of the link mechanism 36 becomes larger, and the angle of folding of the link mechanism 38 becomes smaller thereby, resulting in the upward movement of the slide 20.

When the second slider 40 is moved upwards or downwards, the position of the first slider 34 in the vertical direction is not varied, and therefore, the angle of folding of the link mechanism 36 is varied. However, the folding and extending range makes no parallel movement in the vertical direction. For this reason, the bottom dead center position and the stroke length of the slide 20 can be adjusted by rotating the sprocket 82.

The bottom dead center position of the slide 20 can be adjusted by detecting the bottom dead center position by means of an arbitrary detector, then comparing the resulting detected value with a predetermined reference value and rotating the sprocket 82 so that the detected value may become the reference value. The stroke length of the slide 20 can be set by preliminarily rotating the sprocket 82 by a predetermined value.

If the position adjusting mechanism 42 described above is used, both of the bottom dead center position and the stroke length can be finely adjusted, since the moving amount of the second slider 40 is small in comparison with the rotational momentum of the worm screw 76. However, other position adjusting mechanism using a lever mechanism or the like may also be used.

In addition, if the four link mechanisms 36 and 38 are used as described above, the reciprocating movement of the slide 20 is stabilized. However, two link mechanisms 36 and 38 may be used, or only one link mechanism 36 may be used as well. In the latter case, the link mechanism 36 and the sliders 34 and 40 are arranged so that the axis 52 may be in the horizontal direction, and the folding and extending motion of the link mechanism 36, e.g., the reciprocating motion of the pivot 46 or 64 is transmitted to not less than one rod 22 by a lever or a link.

Furthermore, the direction of the motion of the slide 20 is preferably in the vertical directions, but it may be in the horizontal direction depending on the types of processing work and the types of press machines or may also be in an inclined direction to the perpendicular direction.

What is claimed is:

1. A power transmission device for a press machine, said device transmitting a rotary motion of a crankshaft supported by a frame to a slide, further comprising:
    a connection link connected to said crankshaft, and reciprocated in accordance with the rotation of said crankshaft;
    a first slider provided in said frame so as to be reciprocated in a first direction, and pivotally connected to said connection link;
    a first link mechanism provided with a pair of first links pivotally connected to each other, wherein one of said first links is pivotally connected to either said connection link or said first slider so as to be folded and extended while following up the reciprocating movement of said first slider;

a second slider provided in said frame displaceably in said first direction, and pivotally connected to the other first link; and a mechanism for adjusting the position of said second slider in said first direction.

2. A power transmission device for a press machine according to claim 1, wherein said position adjusting mechanism is provided with a male screw connected to said second slider and extending in said first direction, a worm wheel engaged with said male screw and provided in said frame rotatably around an axis extending in said first direction and immovably to said first direction, and a worm screw geared with said worm wheel.

3. A power transmission device for a press machine according to claim 1 or 2, further comprising a second link mechanism provided with a pair of second links pivotally connected to each other, said second link mechanism being connected to said first link mechanism so as to be folded and extended while following up the folding and extending motion of said first link mechanism, wherein one of said second links is pivotally connected to said frame and the other second link is pivotally connected to a first rod extending from said slide in a second direction parallel to said first direction.

4. A power transmission device for a press machine according to claim 3, further comprising:

a third link mechanism provided with a pair of third links pivotally connected to each other, wherein one of said third links is pivotally connected to either said connection link or said first slider and the other third link is pivotally connected to said second slider, respectively, so as to be folded and extended, in synchronism with said first link mechanism while following up the reciprocating movement of said connection link; and a fourth link mechanism provided with a pair of fourth links pivotally connected to each other, said fourth link mechanism being connected to said third link mechanism so as to be folded and extended while following up the folding and extending motion of said third link mechanism, wherein one of said fourth links is pivotally connected to said frame and the other fourth link is pivotally connected to a second rod extending from said slide in a third direction parallel to said first and second directions, respectively.

5. A power transmission device for a press machine according to claim 1, wherein said frame has a guide portion for regulating the movements of said first and second sliders to the reciprocating movements in said first direction.

6. A power transmission device for a press machine according to claim 1, wherein said first direction is the vertical direction.

* * * * *